(12) United States Patent
Chapin

(10) Patent No.: US 6,561,373 B1
(45) Date of Patent: May 13, 2003

(54) TANKER HATCH SYSTEM

(76) Inventor: Roland D. Chapin, 5050 SE. Columbus, #191, Albany, OR (US) 97321

( * ) Notice: Subject to any disclaimer, the term of this patent is extended or adjusted under 35 U.S.C. 154(b) by 18 days.

(21) Appl. No.: 09/899,967

(22) Filed: Jul. 6, 2001

(51) Int. Cl.[7] .............................................. B65D 43/26
(52) U.S. Cl. ...................... 220/262; 220/345.1; 49/360
(58) Field of Search ................................ 220/260, 262, 220/345.1, 351; 49/208, 209, 216, 221, 360, 404, 408; 280/830, 838, 839

(56) References Cited

U.S. PATENT DOCUMENTS

| | | | | |
|---|---|---|---|---|
| 2,227,712 A | * | 1/1941 | Hackley | 49/209 |
| 2,842,283 A | * | 7/1958 | Smith | 220/262 |
| 3,131,925 A | * | 5/1964 | Coats | 220/262 |
| 3,142,410 A | * | 7/1964 | Arnold | 220/262 |
| 3,386,206 A | * | 6/1968 | Loveless | 49/209 |
| 3,722,936 A | | 3/1973 | Stubert | |
| 3,888,528 A | | 6/1975 | Jericijo | |
| 4,267,936 A | * | 5/1981 | Pavlicek | 220/262 |
| 4,327,522 A | | 5/1982 | Meadows | |
| 4,655,004 A | | 4/1987 | Caillet | |
| 4,762,345 A | | 8/1988 | Stluka et al. | |
| 4,854,076 A | | 8/1989 | Sieben et al. | |
| 6,105,805 A | * | 8/2000 | Labelle et al. | 220/262 |
| 6,196,590 B1 | * | 3/2001 | Kim | 220/262 |

* cited by examiner

*Primary Examiner*—Nathan J. Newhouse
(74) *Attorney, Agent, or Firm*—Kaardal & Leonard, LLP

(57) ABSTRACT

A tanker hatch system for permitting remote opening and closing of a hatch opening in a tank. The tanker hatch system includes a collar wall for mounting on an upper wall of a tank and extending about an opening in the upper wall for defining a channel into an interior of the tank. The channel includes an axis. A cover slidably mounted on the collar wall is provided for selectively closing the channel. The cover is movable in a plane oriented generally perpendicular to the axis of the channel. The cover includes a closed position wherein the cover closes the channel in the collar wall and an open position wherein the channel in the collar wall is substantially unobstructed by the cover. A moving mechanism is provided for moving the cover between the closed and open positions.

20 Claims, 4 Drawing Sheets

TANKER HATCH SYSTEM

BACKGROUND OF THE INVENTION

1. Field of the Invention

The present invention relates to hatch systems and more particularly pertains to a new tanker hatch system for permitting remote opening and closing of a hatch opening in a tank.

2. Description of the Prior Art

The use of hatch systems is known in the prior art. Known hatch systems often require an operator to climb on top of the tank to manually release the hatch securing or locking mechanisms, and then lift the hatch cover, which is often very heavy to pivot open and closed. This operation can be hazardous to the operator, since a fall from the typical height of the top of tank is a significant hazard to the safety of the operator. Any moisture on the top of the tank can make climbing up on the tank and opening the hatch more challenging, especially in inclement weather.

Powered hatch opening and closing systems have been devised for permitting remote operation of a hatch and thereby removing the burden from the operator of having to climb onto the tank to operate the hatch. The known systems pivot the hatch cover between closed and open positions in a manner similar to the manually-operated hatch systems, which can permit retrofit of existing manually-operated hatch systems with the powered gear. However, the significant weight of the typical hatch can place a significant strain on the powered hatch operating mechanism. Further, powered operating mechanisms that position the open hatch cover substantially perpendicular to the top of the tank can obstruct tank-filling equipment.

In these respects, the tanker hatch system according to the present invention substantially departs from the conventional concepts and designs of the prior art, and in so doing provides an apparatus primarily developed for the purpose of permitting remote opening and closing of a hatch opening in a tank while avoiding the disadvantages of the known powered hatch opening systems.

SUMMARY OF THE INVENTION

In view of the foregoing disadvantages inherent in the known types of hatch systems now present in the prior art, the present invention provides a new tanker hatch system construction wherein the same can be utilized for permitting remote opening and closing of a hatch opening in a tank.

To attain this, the present invention generally comprises a collar wall for mounting on an upper wall of a tank and extending about an opening in the upper wall for defining a channel into an interior of the tank. The channel includes an axis. A cover slidably mounted on the collar wall is provided for selectively closing the channel. The cover is movable in a plane oriented generally perpendicular to the axis of the channel. The cover includes a closed position wherein, the cover closes the channel in the collar wall and an open position wherein, the channel in the collar wall is substantially unobstructed by the cover. Moving means is provided for moving the cover between the closed and open positions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
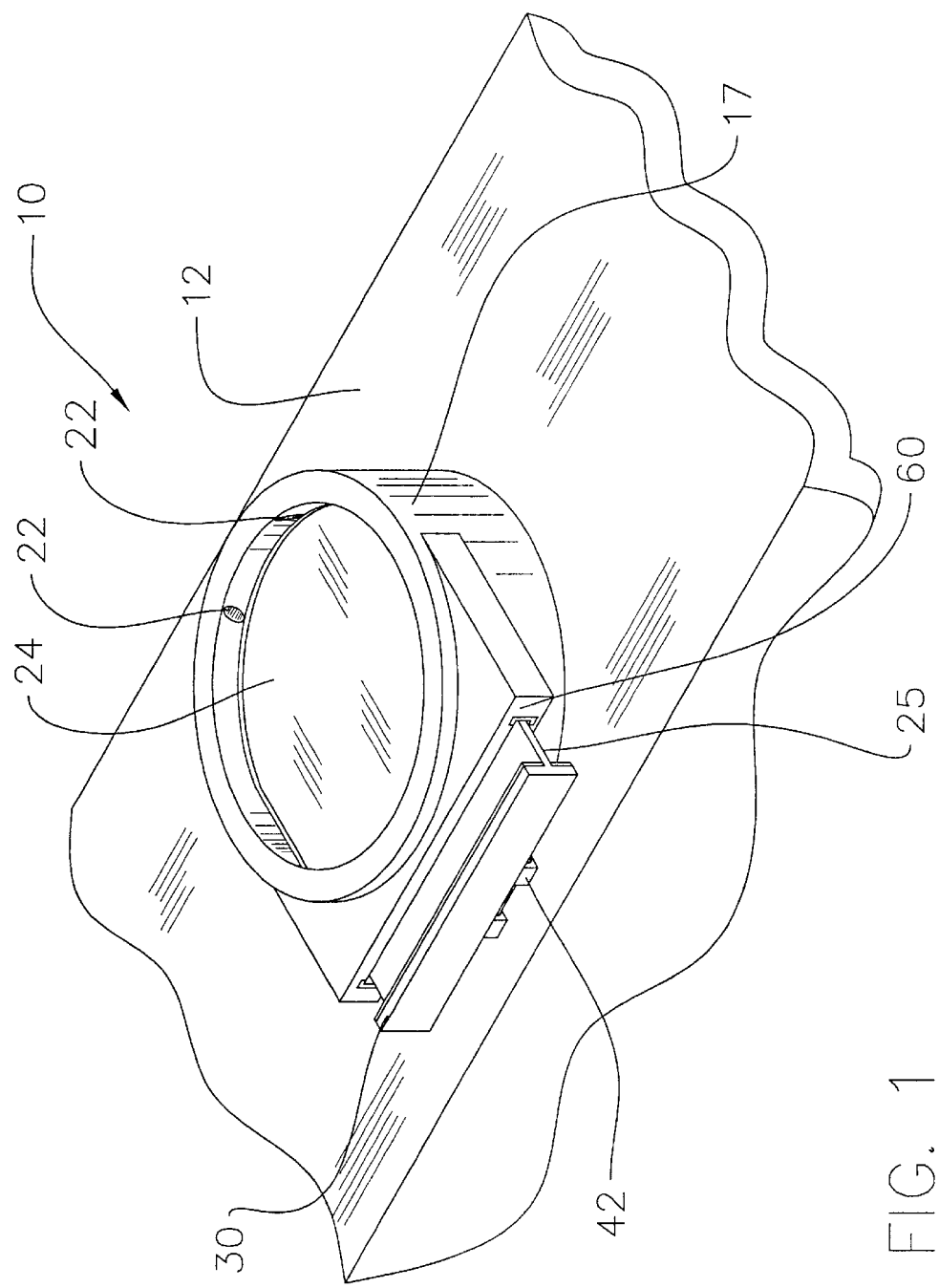
FIG. 1 is a schematic perspective view of a portion of a tank with the tanker hatch system of the present invention installed thereon.
Figure 2:
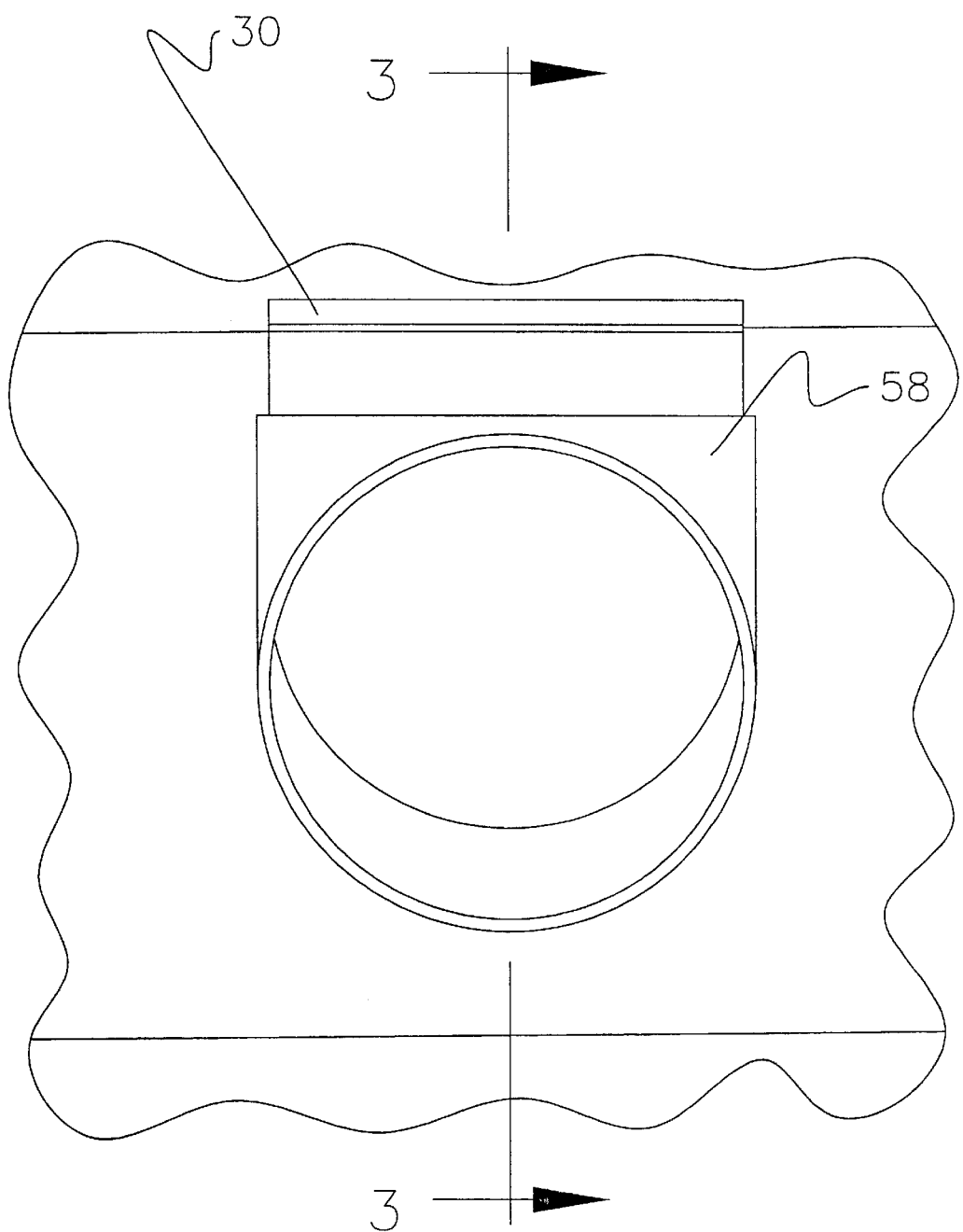
FIG. 2 is a schematic top view of the present invention.

With reference now to the drawings, and in particular to FIGS. 1 through 4 thereof, a new tanker hatch system embodying the principles and concepts of the present invention and generally designated by the reference numeral 10 will be described.

As best illustrated in FIGS. 1 through 4, the tanker hatch system 10 generally comprises a collar wall 17 having a channel 18, a cover 24 for covering the channel, and moving means 32 for moving the cover 24.

The tanker hatch system 10 of the invention is most suitably employed as a part of a tanker system for mounting on a vehicle for transporting materials, such as liquid or powdered materials. The tanker system includes a tank 12 that is mountable on a vehicle, and the tank 12 has an interior 13 and an upper wall 14 with an opening 15 extending into the interior 13 of the tank 12. Typically, the opening 15 in the upper wall 14 is substantially circular, although other shapes may be employed to accommodate the collar wall 17 of the invention.

As illustrated in FIG. 1, the collar wall 17 is mounted on the upper wall 14 of the tank 12, and extends along the perimeter of the opening 15 in the upper wall 14 of the tank 12. As particularly illustrated in FIG. 3, the collar wall 17 defines a channel 18 extending into the interior 13 of the tank 12. The channel 18 has an axis that is oriented generally perpendicular to the upper wall 14 of the tank 12. The collar wall 17 may extend substantially perpendicular to the upper wall 17 of the tank 12. Preferably, the collar wall is substantially cylindrical in shape, however, other shapes may be employed to accommodate the opening 15 of the upper wall 14 or various tank filling structures employed to fill the interior of the tank. In one preferred embodiment of the invention, the collar wall 17 preferably extends into the interior 13 of the tank 12 below the top wall. The collar wall may have an upper lip edge 19, and preferably the upper lip edge lies in a plane oriented substantially parallel to the upper wall 14 of the tank 12. Illustratively, the collar wall 17 may have a thickness measuring approximately one-half inch and a diameter measuring approximately nineteen inches. However, the thickness and diameter of the collar wall 17 may vary depending upon such factors as the type of cargo being carried and the size of the tank 12.

As illustrated in FIG. 1, a slot 20 may be formed in the collar wall 17. The slot 20 preferably extends about the circumference of the collar wall for approximately half of the length of the circumference of the collar wall 17. In one embodiment of the invention, the slot 20 preferably lies in a plane, or slot plane, that is oriented at an angle with respect to the horizontal (see FIG. 3). The slot plane may also be oriented at an angle with respect to the plane of the upper lip edge 19 of the collar wall 17, and may also be oriented at an angle with respect to a plane defined by the top wall of the tank. The sloping of the slot plane produces a sloping of the cover 24 with respect to the horizontal when the cover is mounted in the slot. Illustratively, the angle between the slot plane and the horizontal (and the planes of the upper lip edge and the top wall of the tank) range between approximately zero and approximately ten degrees, and most preferably is approximately five degrees. In a preferred embodiment of the invention, the slot 20 is formed on a portion of the collar wall lying adjacent to the side wall of the tank such that the cover moves in a direction that is oriented substantially perpendicular to an axis extending between the front and rear of the tank.

As illustrated in FIG. 1, a weep hole 22 may extend through the collar wall 17. The weep hole is preferably located adjacent to a lowermost point of the cover 24, especially in embodiments where a sloping of the slot produces a sloping of the cover, so that liquid on the top surface of the cover may escape from inside the collar wall through the weep hole. The weep hole 22 is preferably located above and adjacent to the slot plane. The weep hole 22 is located on the collar wall 17 at a location generally opposite from a midpoint of a length of the slot 20. Optionally, a pair of weep holes 22 may be formed in the collar wall 17.

In one embodiment of the present invention, the collar wall 17 has a depth measuring approximately eight inches. The collar wall 17 is preferably adapted to extend approximately six inches above the upper wall 14 of the tank 12. The collar wall 17 may also be adapted such that an insertion portion of the collar wall 17 is inserted into the interior 13 of the tank 12. The insertion portion may have a height of approximately 2 inches. Other embodiments of the present invention may employ other dimensions depending upon such factors as cargo being carried in the tank 12 and the size of the tank 12.

As illustrated in FIG. 1, the cover 24 is provided for selectively closing the channel 18 in the collar wall 17. The cover 24 is slidably mounted on the collar wall 17 and is movable in a plane oriented generally perpendicular to the axis of the channel 18. The cover 24 is movable in a plane oriented substantially parallel to a plane defined by an upper lip edge 19 of the collar wall 17. In the most preferred embodiment of the invention, the cover is slidably mounted on the slot in the collar wall 17, and is slidable through the slot 20. The cover 24 has a closed position wherein the cover 24 closes the channel 18 in the collar wall 17. The cover also has an open position wherein the channel 18 in the collar wall 17 is substantially unobstructed by the cover 24.

The cover 24 has a perimeter edge 25. In one preferred embodiment of the invention, the perimeter edge 25 includes a semi-circular section 26, a base section 27 located opposite the semi-circular section 26, and a pair of side sections 28 extending between the base section 27 and the semi-circular section 26. Illustratively, the pair of side sections 28 and the base section 27 are substantially linear, and the side sections 28 are oriented substantially parallel to each other.

The cover 24 may include a base member 30 that is mounted on the base section 27 of the perimeter edge 25 of the cover 24. The base member 30 is preferably orientated generally perpendicular to the cover 24.

Figure 3:
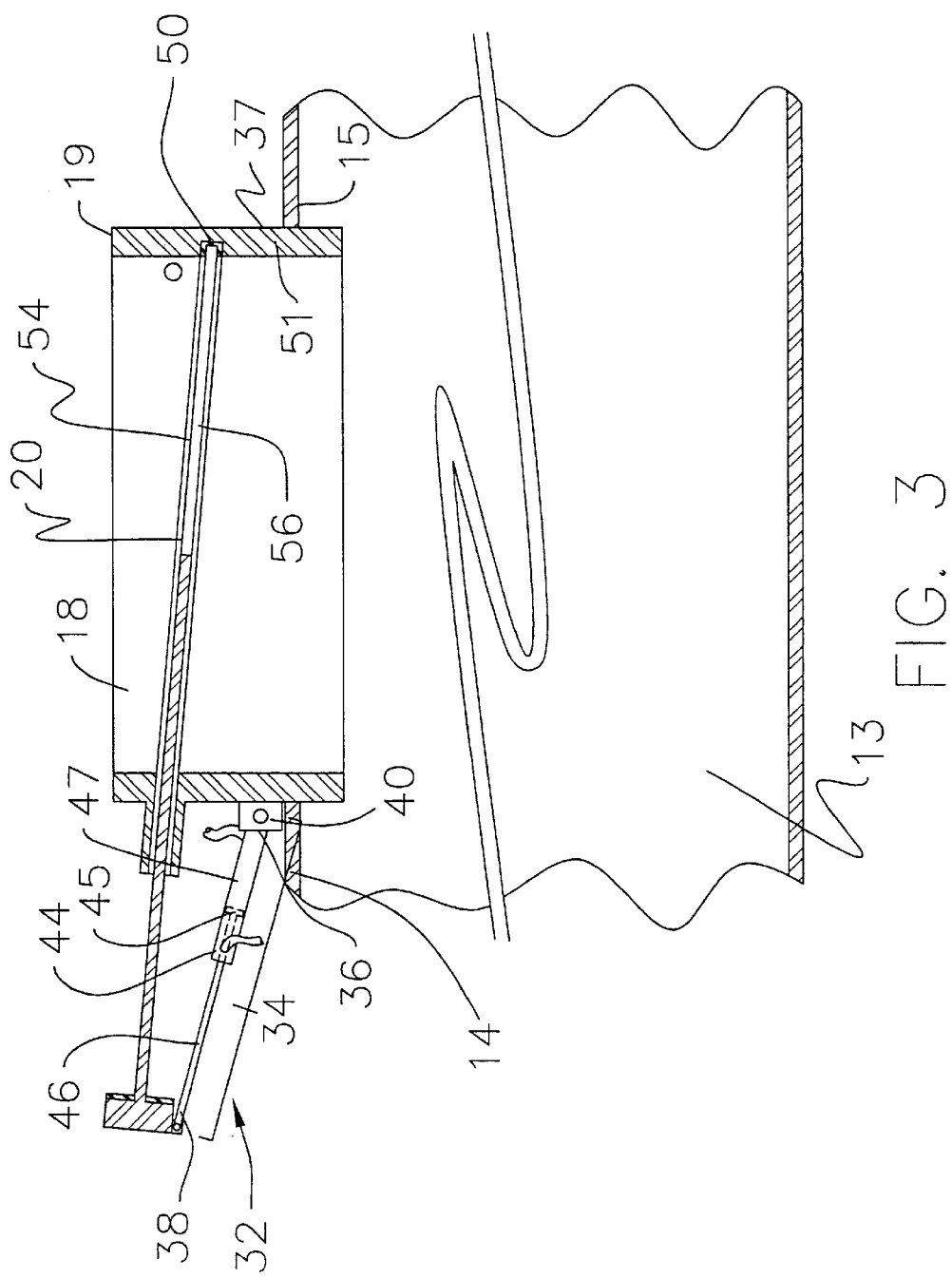
FIG. 3 is a schematic sectional view of the present invention taken along line 3—3 of FIG. 2.
Figure 4:
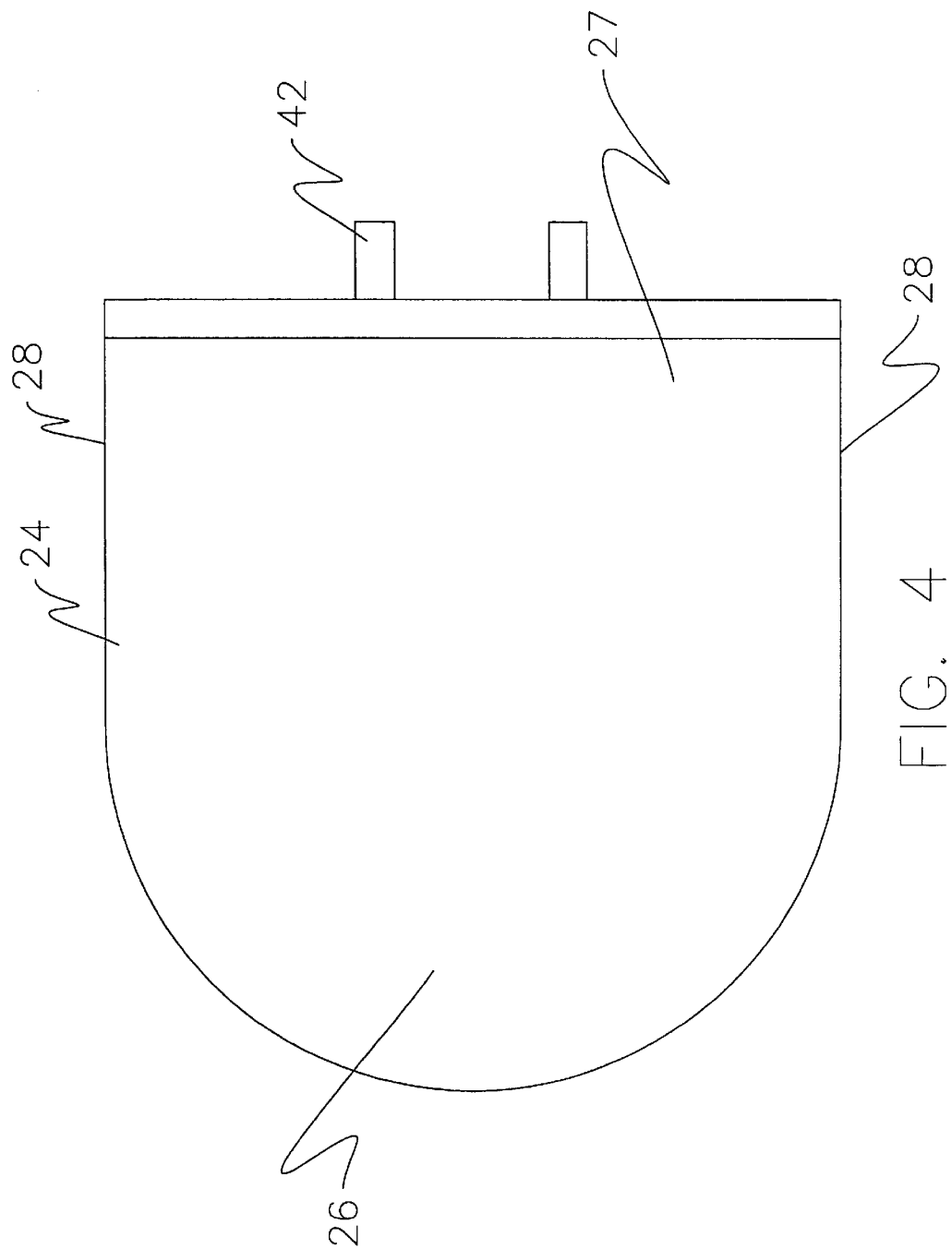
FIG. 4 is a schematic top view of the cover of the present invention.

As illustrated in FIG. 3, moving means is provided for moving the cover 24 between the closed and open positions. The moving means may comprise a moving mechanism 32 is mounted on the collar wall 17 and the cover 24. The moving mechanism 32 preferably comprises an extension/retraction assembly 34. The extension/retraction assembly 34 may extends along an axis positioned at an angle with respect to the slot plane.

The extension/retraction assembly 34 has opposite mounting ends. A first one. 36 of the mounting ends of the extension/retraction assembly 34 is mounted on the collar wall 17. The first mounting end 36 is preferably mounted on an exterior surface 37 of the collar wall 17. A second one 38 of the mounting ends of the extension/retraction assembly 34 is mounted on the cover 24.

As particularly illustrated in FIG. 3, a first mounting bracket 40 may be mounted on the collar wall 17. The first mounting bracket 40 is preferably mounted on the outer surface 37 of the collar wall 17. The first mounting end 36 of the extension/retraction assembly 34 is preferably mounted on the first mounting bracket 40.

A second mounting bracket 42 may be mounted on the cover 24. The second mounting bracket 42 is preferably mounted on the base section 27 of the perimeter edge 25 of the cover 24. The second mounting end 38 of the extension/retraction assembly 34 is preferably mounted on the second mounting bracket 42.

In one embodiment of the present invention, the extension/retraction assembly 34 preferably comprises a piston/cylinder assembly 44. The piston/cylinder assembly 44 may be double acting, with a piston 45 and a rod 46 being slidably mounted in a cylinder 47. The first mounting end 36 is preferably located on the cylinder 47. The second mounting end 38 is preferably located on the rod 46. It should be understood that other extension and retraction mechanisms may be employed as the moving means, such as, for example, mechanisms employing screw threaded rods and rack and pinion structures.

As illustrated in FIG. 3, a support recess 50 may be provided for supporting the cover 24 when the cover 24 is in the closed position. The support recess 50 is preferably formed on an inner surface 51 of the collar wall 17 for receiving an edge portion of the cover when the cover is in the closed position. The support recess 50 is preferably located opposite the slot 20 and in the slot plane. The support recess 50 may extend along a semi-circular arc.

In one embodiment of the present invention, a gasket 54 may be positioned in the recess 50 for resisting movement of material into (e.g., moisture, debris) and out of (e.g., the contents of the tank) the interior 13 of the tank 12. The gasket 54 is preferably mounted on the collar wall 17 so that the gasket is positioned adjacent to the outer perimeter edge 25 of the semicircular section of the cover 24 when the cover is in the closed position. As a highly preferred option, the gasket also extends above or over a portion of an upper surface of the cover when the cover is in the closed position so that pressurizing of the interior of the tank tends to press the cover upwardly against the gasket to further enhance the fit of the gasket against the cover. Another highly preferred option has a portion of the gasket extending below or under a portion of a lower surface of the cover when the cover is in a closed position. One highly preferred configuration of the gasket 54 that satisfies all of the preferred options is a generally C-shaped or U-shaped gasket (see FIG. 3) positioned in the recess to define a secondary recess 54 that receives the perimeter edge of the cover therein when the cover is in the closed position. Preferably, the gasket comprises a resiliently compressible material.

A support sleeve 58 may be provided for receiving the cover 24. The support sleeve 58 is mounted on the collar wall 17. A passage 60 extends through the support sleeve 58 and has a portion of the cover positioned therein. The passage 60 is in communication with the slot 20 of the collar wall 17 such that the cover is movable in the passage and the slot between the open and closed positions. The passage 60 extends in the slot plane. Preferably, the gasket 58 extends through the slot and into passage 60 of the support sleeve so that a portion of the perimeter edge of the cover moves or rides in the secondary recess of the gasket as the cover moves between the open and closed positions (see FIGS. 1 and 3).

As a preferred option, an inner face of the base member 30 has a resiliently compressible material applied thereon (see FIGS. 1 and 3) such that the material is positioned adjacent to the passage in the support sleeve when the cover is in the closed position for blocking movement of substances between the base member and the support sleeve when the cover is in the closed position.

In use, a driver of the vehicle may open or close the cover 24 by activating the piston/cylinder assembly 34. An operating fluid, such as air or a hydraulic liquid, may be used to actuate the piston/cylinder assembly 34 to move the cover 24 along the slot plane in the collar wall 17. Air is a highly suitable operating fluid as many vehicles have compressed air source available for operating brakes and the like. In the open position, the tank 12 may be filled by funneling cargo through the channel 18 of the collar wall 17 that extends into the interior 13 of the tank.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hatch system comprising:

a collar wall for mounting on an upper wall of a tank and extending about an opening in the upper wall for defining a channel into an interior of the tank, the channel having an axis;

a cover for selectively closing the channel in the collar wall, the cover being slidably mounted on the collar wall, the cover being movable in the channel, the cover having a closed position wherein the cover closes the channel in the collar wall, the cover having an open position wherein the channel in the collar wall is substantially unobstructed by the cover; and moving means for moving the cover between the closed and open positions;

wherein the cover has a perimeter edge, the perimeter edge including a semi-circular section, a base section located opposite the semi-circular section, and a pair of side sections extending between the base section and the semi-circular section.

2. The system of claim 1 wherein the side sections of the perimeter edge are substantially linear, the base section is substantially linear, and the side sections are oriented substantially parallel.

3. The system of claim 1 additionally comprising a support recess for supporting the cover when the cover is in the closed position, the support recess being formed on an inner surface of the collar wall.

4. The system of claim 3 wherein a slot is formed in the collar wall with the cover being slidable through the slot, the support recess being located opposite the slot.

5. The system of claim 1 wherein a slot is formed in the collar wall, and the cover is slidable through the slot.

6. The system of claim 5 wherein the collar wall is substantially cylindrical, the slot extending about approximately half of a circumference of the collar wall.

7. The system of claim 5 additionally comprising a support sleeve being mounted on the collar wall, a passage extending through the support sleeve and having a portion of the cover positioned therein, the passage being in communication with the slot of the collar wall such that the cover is movable in the passage and the slot between the open and closed positions.

8. A hatch system comprising:

a collar wall for mounting on an upper wall of a tank and extending about an opening in the upper wall for defining a channel into an interior of the tank, the channel having an axis;

a cover for selectively closing the channel in the collar wall, the cover being slidably mounted on the collar wall, the cover being movable in the channel, the cover having a closed position wherein the cover closes the channel in the collar wall, the cover having an open position wherein the channel in the collar wall is substantially unobstructed by the cover; and moving means for moving the cover between the closed and open positions;

wherein a slot is formed in the collar wall, and the cover is slidable through the slot;

wherein the slot lies in a slot plane;

wherein the collar wall has an upper lip edge, the upper lip edge being located in a plane, the slot plane being oriented at an angle with respect to the plane of the upper lip edge of the collar wall.

9. The system of claim 8 additionally comprising a support recess for supporting the cover when the cover is in the closed position, the support recess being formed on an inner surface of the collar wall.

10. The system of claim 8 additionally comprising a support sleeve being mounted on the collar wall, a passage extending through the support sleeve and having a portion of the cover positioned therein, the passage being in communication with the slot of the collar wall such that the cover is movable in the passage and the slot between the open and closed positions.

11. A hatch system comprising:
   a collar wall for mounting on an upper wall of a tank and extending about an opening in the upper wall for defining a channel into an interior of the tank, the channel having an axis;
   a cover for selectively closing the channel in the collar wall, the cover being slidably mounted on the collar wall, the cover being movable in the channel, the cover having a closed position wherein the cover closes the channel in the collar wall, the cover having an open position wherein the channel in the collar wall is substantially unobstructed by the cover; and
   moving means for moving the cover between the closed and open positions;
   wherein the moving means comprises an extension/retraction assembly;
   wherein the extension/retraction assembly has opposite mounting ends, a first one of the mounting ends of the extension/retraction assembly being mounted on the collar wall and a second one of the mounting ends of the extension/retraction assembly being mounted on the cover.

12. A hatch system comprising:
   a collar wall for mounting on an upper wall of a tank and extending about an opening in the upper wall for defining a channel into an interior of the tank, the channel having an axis;
   a cover for selectively closing the channel in the collar wall, the cover being slidably mounted on the collar wall, the cover being movable in the channel, the cover having a closed position wherein the cover closes the channel in the collar wall, the cover having an open position wherein the channel in the collar wall is substantially unobstructed by the cover; and
   moving means for moving the cover between the closed and open positions;
   wherein a slot is formed in the collar wall, and the cover is slidable through the slot;
   wherein the slot lies in a slot plane;
   wherein a weep hole extends through the collar wall, the weep hole being located above and adjacent to the slot plane.

13. The system of claim 12 wherein the slot plane is oriented at an angle of approximately five degrees with respect to a plane defined by an upper lip edge of the collar wall to induce movement of any moisture on an upper surface of the cover through the weep hole in the collar wall.

14. The system of claim 11 wherein the collar wall has an upper lip edge, the upper lip edge being located in a plane, the slot plane being oriented at an angle with respect to the plane of the upper lip edge of the collar wall.

15. The system of claim 12 additionally comprising a support recess for supporting the cover when the cover is in the closed position, the support recess being formed on an inner surface of the collar wall.

16. The system of claim 12 additionally comprising a support sleeve being mounted on the collar wall, a passage extending through the support sleeve and having a portion of the cover positioned therein, the passage being in communication with the slot of the collar wall such that the cover is movable in the passage and the slot between the open and closed positions.

17. A hatch system comprising:
   a collar wall for mounting on an upper wall of a tank and extending about an opening in the upper wall for defining a channel into an interior of the tank, the channel having an axis;
   a cover for selectively closing the channel in the collar wall, the cover being slidably mounted on the collar wall, the cover being movable in the channel, the cover having a closed position wherein the cover closes the channel in the collar wall, the cover having an open position wherein the channel in the collar wall is substantially unobstructed by the cover; and
   moving means for moving the cover between the closed and open positions;
   a support recess for supporting the cover when the cover is in the closed position, the support recess being formed on an inner surface of the collar wall;
   wherein a gasket is positioned in the support recess, the gasket defining a secondary recess for receiving a portion of a perimeter edge of the cover, the gasket comprising a resiliently compressible material.

18. The system of claim 17 additionally comprising a support sleeve being mounted on the collar wall, a passage extending through the support sleeve and having a portion of the cover positioned therein, the passage being in communication with a slot formed in the collar wall opposite the support recess, and wherein the gasket extends into the passage in the support sleeve.

19. The system of claim 17 wherein a portion of the gasket extends above a portion of an upper surface of the cover when the cover is in the closed position such pressure in the interior of the tank presses the cover against the gasket.

20. A tanker system for mounting on a vehicle for transporting materials, the tanker system comprising:
   a tank having an interior and an upper wall with an opening, the opening being substantially circular;
   a collar wall mounted on the upper wall of the tank, the collar wall extending about the opening in the upper wall of the tank, the collar wall defining a channel into the interior of the tank, the collar wall extending substantially perpendicular to the upper wall of the tank, the collar wall being substantially cylindrical, the collar wall extending into the interior of the tank, the collar wall having an upper lip edge, the upper lip edge being located in a plane, the plane being oriented substantially parallel to the upper wall of the tank;
   a slot being formed in the collar wall, the slot extending about approximately half of a circumference of the collar wall, the slot lying in a slot plane, the slot plane being oriented at an angle with respect to the plane of the upper lip edge of the collar wall, the slot plane being oriented at an angle with respect to a plane of the upper wall of the tank;
   a weep hole extending through the collar wall, the weep hole being located above and adjacent to the slot plane, the weep hole being located on the collar wall at a location generally opposite from a midpoint of a length of the slot, wherein a pair of weep holes are formed in the collar wall;

a cover for selectively closing the channel in the collar wall, the cover being slidably mounted on the collar wall, the cover being slidable through the slot in the collar wall, the cover having a closed position wherein the cover closes the channel in the collar wall, the cover having an open position wherein the channel in the collar wall is substantially unobstructed by the cover;

wherein the cover has a perimeter edge, the perimeter edge including a semi-circular section, a base section located opposite the semi-circular section, and a pair of side sections extending between the base section and the semi-circular section, the side sections being substantially linear, the base section being substantially linear, the side sections being oriented substantially parallel;

wherein the cover includes a base member, the base member being mounted on the base section of the perimeter edge of the cover;

moving means for moving the cover between the closed and open positions, the moving means being mounted on the collar wall and the cover, the moving means comprising an extension/retraction assembly, the extension/retraction assembly extending along an axis positioned at an angle with respect to the slot plane, the extension/retraction assembly having opposite mounting ends;

a first one of the mounting ends of the extension/retraction assembly being mounted on the collar wall, the first mounting end being mounted on an exterior surface of the collar wall;

a second one of the mounting ends of the extension/retraction assembly being mounted on the cover, the second end being mounted on the mounting bracket of the cover;

a first mounting bracket mounted on the collar wall, the first mounting bracket being mounted on an outer surface of the collar wall, the first mounting end of the extension/retraction assembly being mounted on the first mounting bracket;

a second mounting bracket mounted on the cover, the mounting bracket being mounted on the base section of the perimeter of the cover, the second mounting end of the extension/retraction assembly being mounted on the second mounting bracket;

wherein the extension/retraction assembly comprises a piston/cylinder assembly, the piston/cylinder assembly being double acting, the piston/cylinder assembly including a piston and a rod slidably mounted in a cylinder, the first mounting end being located on the cylinder, the second mounting end being located on the rod;

a support recess for supporting the cover when the cover is in the closed position, the support recess being formed on an inner surface of the collar wall for receiving an edge portion of the cover when the cover is in the closed position, the support recess being located opposite the slot, the support recess being located in the slot plane, the support recess extending along a semi-circular arc;

a gasket positioned in the support recess, the gasket having a generally U-shaped cross-section defining a secondary recess for receiving a portion of a perimeter edge of the cover, the gasket comprising a resiliently compressible material;

a support sleeve for receiving the cover, the support sleeve being mounted on the collar wall, a passage extending through the support sleeve and having a portion of the cover positioned therein, the passage being in communication with the slot of the collar wall such that the cover is movable in the passage and the slot between the open and closed positions, the passage extending in the slot plane, a portion of the gasket extending into the passage in the support sleeve;

wherein the slot plane is oriented at an angle of approximately five degrees with respect to the plane of the upper lip edge of the collar wall to induce movement of any moisture on an upper surface of the cover, wherein a vertically lowermost position on the cover is located adjacent to the weep hole.

* * * * *